(12) United States Patent
Peng et al.

(10) Patent No.: US 8,988,452 B2
(45) Date of Patent: Mar. 24, 2015

(54) COLOR ENHANCEMENT VIA GAMUT EXPANSION

(71) Applicants: Ya-Ti Peng, Santa Clara, CA (US); Yi-Jen Chiu, San Jose, CA (US)

(72) Inventors: Ya-Ti Peng, Santa Clara, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/722,380

(22) Filed: Dec. 20, 2012

(65) Prior Publication Data

US 2014/0111537 A1 Apr. 24, 2014

Related U.S. Application Data

(60) Provisional application No. 61/715,604, filed on Oct. 18, 2012.

(51) Int. Cl.

| | |
|---|---|
| G09G 5/02 | (2006.01) |
| G09G 5/36 | (2006.01) |
| G06F 15/16 | (2006.01) |
| H04N 5/202 | (2006.01) |
| H04N 9/73 | (2006.01) |
| H04N 5/14 | (2006.01) |
| H04N 1/46 | (2006.01) |
| G03F 3/08 | (2006.01) |
| G06K 9/00 | (2006.01) |
| G06K 9/40 | (2006.01) |
| G06F 3/048 | (2013.01) |

(52) U.S. Cl.
CPC ........................ *G09G 5/02* (2013.01)
USPC .......... 345/590; 345/606; 345/690; 345/549; 345/502; 348/254; 348/223.1; 348/655; 348/672; 358/516; 358/519; 358/522; 382/167; 382/169; 382/274; 715/757

(58) Field of Classification Search
USPC ......... 345/589–590, 606, 618–619, 660, 690, 345/549, 501–502; 348/254, 223.1, 557, 348/630, 655, 671–672, 687; 358/516, 358/518–522, 448; 382/162, 167–169, 254, 382/274, 276; 715/756–757
See application file for complete search history.

(56) References Cited

U.S. PATENT DOCUMENTS

| | | | | |
|---|---|---|---|---|
| 6,658,399 | B1 * | 12/2003 | Acharya et al. | 706/52 |
| 6,677,959 | B1 * | 1/2004 | James | 345/660 |
| 2004/0061902 | A1 | 4/2004 | Tang et al. | |
| 2007/0160285 | A1 | 7/2007 | Gondek et al. | |
| 2009/0278982 | A1 * | 11/2009 | Imai et al. | 348/453 |
| 2011/0013208 | A1 * | 1/2011 | Bhaskaran et al. | 358/1.9 |
| 2012/0113441 | A1 * | 5/2012 | Hama et al. | 358/1.9 |
| 2012/0249633 | A1 * | 10/2012 | Tanaka | 347/9 |

FOREIGN PATENT DOCUMENTS

| | | |
|---|---|---|
| JP | 2009-055304 A | 3/2009 |
| JP | 2009-117951 A | 5/2009 |

OTHER PUBLICATIONS

International Search Report and Written Opinion Received for Patent Application No. PCT/US2013/047244, mailed on Oct. 18, 2013, 12 pages.

* cited by examiner

*Primary Examiner* — Wesner Sajous
(74) *Attorney, Agent, or Firm* — Lynch Law Patent Group

(57) ABSTRACT

Systems, apparatus, articles, and methods are described including operations for color enhancement via gamut expansion.

24 Claims, 8 Drawing Sheets

COLOR ENHANCEMENT VIA GAMUT EXPANSION

RELATED APPLICATIONS

The present application claims the benefit of U.S. Provisional Application No. 61/715,604 filed Oct. 18, 2012, and titled "COLOR ENHANCEMENT VIA GAMUT EXPANSION".

BACKGROUND

Color enhancement is often a feature in media applications. For example, in video conference applications, where a low-lighting environment is often encountered, it may be useful to improve the overall lighting sensation and color appearance for end-to-end users. Adaptively enhancing the appearance of content originally with less colorfulness, for another instance, may be an appealing feature for web browsing.

Conventional approaches to improving color (e.g., saturation enhancement) often include the procedure of transforming the input content into HSV space, applying transfer/mapping functions (e.g., a scaling function on S-axis for saturation enhancement) in HSV space, and transforming the processed content back to its original color space. The computation consumed by these approaches can be high due to non-linear transformation to HSV space.

Absolute Colorimetric, one of the four general categories of gamut mapping defined by ICC color management, may commonly be used to match input content to an output device with its gamut different from that of the input content for better visualization. Absolute Colorimetric matches measured value to measured value (e.g., CIE XYZ value) and a 3×3 matrix multiplier is sufficient to operate such matching.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
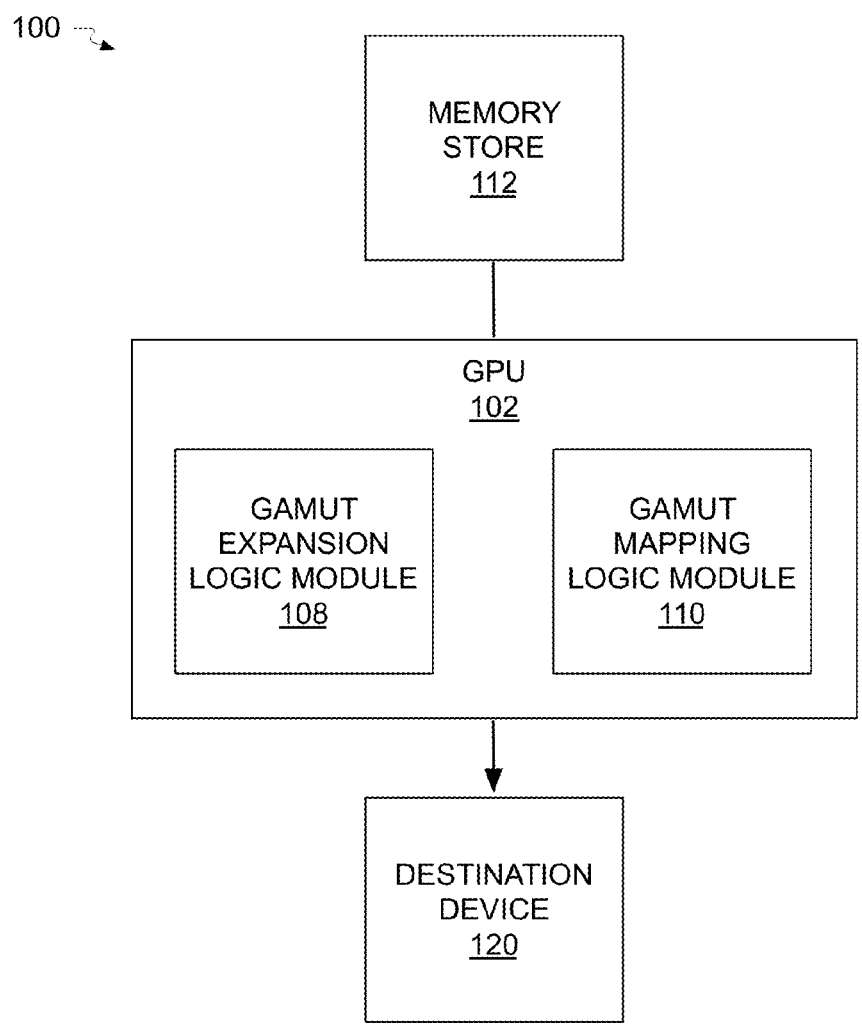
FIG. 1 is an illustrative diagram of an example color management system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", "embodiment", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, aspect, element, or characteristic is described in connection with an implementation or embodiment, it is submitted that it is within the knowledge of one skilled in the art to effect such feature, structure, aspect, element, or characteristic in connection with other implementations or embodiments whether or not explicitly described herein. Any feature, structure, aspect, element, or characteristic from an embodiment can be combined with any feature, structure, aspect, element, or characteristic of any other embodiment.

Systems, apparatus, articles, and methods are described below including operations for color enhancement via gamut expansion.

As will be described in greater detail below, operations for general color enhancement based on a variant of the concept behind Absolute Colorimetric Mapping may be used for color enhancement via gamut expansion. Instead of (or in addition to) treating an input and an output as with two different gamuts, a virtual output gamut may first be generated to derive the 3×3 transform matrix in the Absolute Colorimetric Mapping operation. With actual output gamut being equal to the input one, the color/colorfulness of input content can be manipulated to present better visual quality.

FIG. 1 is an illustrative diagram of an example color management system 100, arranged in accordance with at least some implementations of the present disclosure. In various implementations, color management system 100 may be configured to undertake color management. Further, in various embodiments, color management system 100 may be implemented as part of an image processor, video processor, and/or media processor. Additional components not illustrated here may be included in color management system 100.

In the illustrated example, color management system 100 may include one or more graphics processing units (GPU) 102, one or more memory stores 112, and/or one or more display devices 120. GPU 102 may be communicatively coupled to destination device 120. Memory stores 112 may be communicatively coupled to GPU 102.

GPU 102 may include processor(s), multicore processors, application specific integrated circuits, programmable logic devices, graphics cards, integrated graphics, general purpose graphics processing unit(s), or the like. In addition, memory stores 112 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 112 may be implemented by cache memory. A system agent/memory controller may include any suitable implementation configured to manage system 100 and to control memory stores 112. Destination device 120 may be configured to present video data. Without being limited by example, destination device 120 may include a display device, a projector, a printer, the like, and/or combinations thereof. In various examples, system 100 may be implemented as a chipset or as a system on a chip. In an example, system 100 may be implemented as a single chip or device having a graphics processor, a quad-core central processing unit, on-board cache, a memory controller input/output (I/O) module (not shown), and a system agent and memory controller configured to manage display function, I/O functions, and direct media interface (DMI) functions.

In some examples, Absolute Colorimetric Mapping may be implemented in GPU 102 (e.g., such as an Intel® GenX Graphics Engine module) as one approach to gamut expansion. GPU 102 may include a gamut expansion logic module 108 and/or a gamut mapping logic module 110 for color management. Gamut expansion logic module 108 and/or gamut mapping logic module 110 may implement color management for output to destination device 120. For example, gamut expansion logic module 108 may be implemented by GPU 102. Gamut expansion logic module 108 may be configured to detect an extent of colorfulness based at least in part on a histogram associated with an input color space. Additionally or alternatively, gamut expansion logic module 108 may be configured to determine a virtual color space based at least in part on the detected extent of colorfulness associated with the input color space. Gamut mapping logic module 110 may be implemented by GPU 102. Gamut mapping logic module 110 may be configured to transform input data from the input color space to the virtual color space via absolute colorimetric mapping.

In various embodiments, gamut expansion logic module 108 and/or gamut mapping logic module 110 may be implemented in hardware, while software may implement other logic modules. For example, in some embodiments, gamut expansion logic module 108 and/or gamut mapping logic module 110 may be implemented by application-specific integrated circuit (ASIC) logic while other logic modules may be provided by software instructions executed by logic processors. However, the present disclosure is not limited in this regard and gamut expansion logic module 108 and/or gamut mapping logic module 110 may be implemented by any combination of hardware, firmware and/or software.

As will be discussed in greater detail below, color management system 100, as described in FIG. 1 may be used to perform some or all of the various functions discussed below in connection with FIGS. 2 and/or 3.

Figure 2:
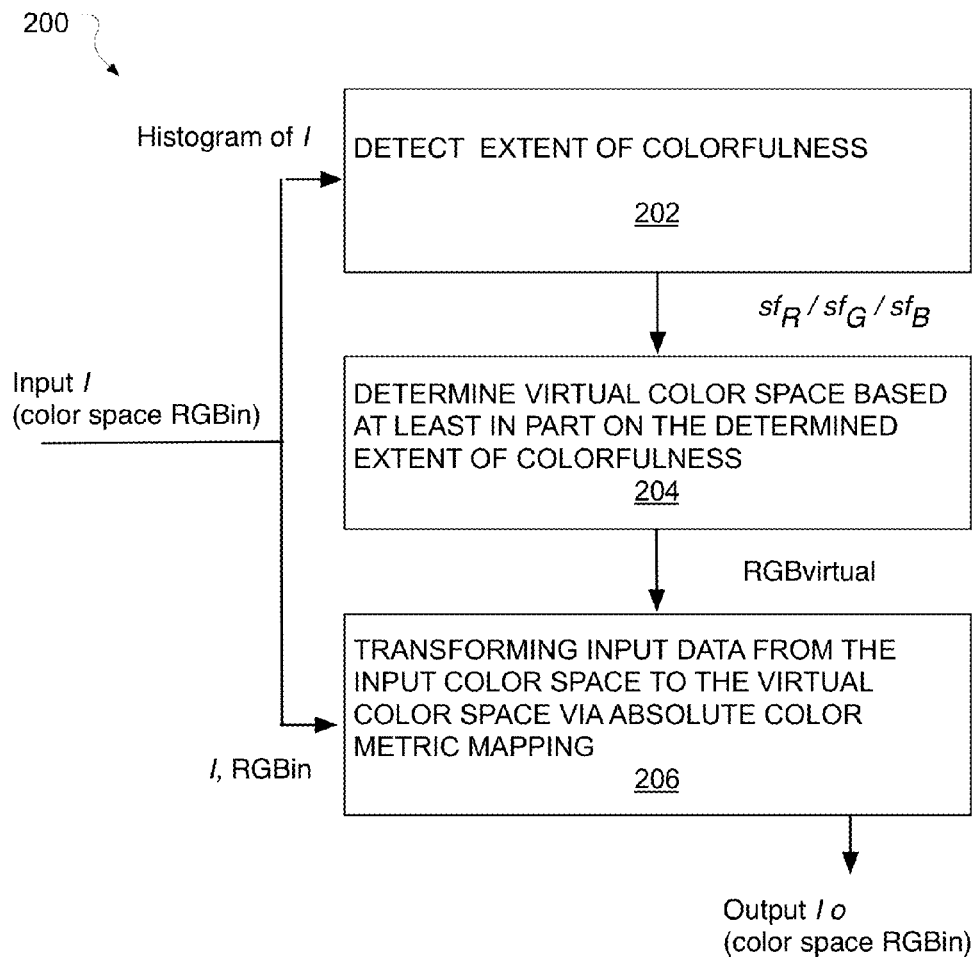
FIG. 2 is another illustrative diagram of an example color management system.

FIG. 2 is a flow chart illustrating an example color management process 200, arranged in accordance with at least some implementations of the present disclosure. In the illustrated implementation, process 200 may include one or more operations, functions or actions as illustrated by one or more of the blocks 202, 204, and/or 206. By way of non-limiting example, process 200 will be described herein with reference to example color management system 100 of FIG. 1.

Process 200 may be utilized as a computer-implemented method for color management. Process 200 may begin at block 202, "DETECT EXTENT OF COLORFULNESS", where an extent of colorfulness may be detected. For example, an extent of colorfulness may be detected based at least in part on a histogram associated with an input color space.

Processing may continue from operation 202 to operation 204, "DETERMINE VIRTUAL COLOR SPACE BASED AT LEAST IN PART ON THE DETERMINED EXTENT OF COLORFULNESS", where a virtual color space may be determined. For example, a virtual color space may be determined based at least in part on the detected extent of colorfulness associated with the input color space.

Processing may continue from operation 204 to operation 206, "TRANSFORM INPUT DATA FROM THE INPUT COLOR SPACE TO THE VIRTUAL COLOR SPACE VIA ABSOLUTE COLOR METRIC MAPPING", where input data from the input color space may be transformed. For example, input data from the input color space may be transformed to the virtual color space via absolute colorimetric mapping.

In operation, process 200 may be utilized as a computer-implemented method for color enhancement via gamut expansion. Process 200 may include gamut expansion for general color enhancement. Process 200 may utilize the operation of Absolute Colorimetric Mapping in (1) a detector of extent of colorfulness, and (2) a content-adaptive virtual color space generator to permit color enhancement with a simple 3×3 matrix multiplication. Accordingly, the virtual color space may be adapted to enhance the colorfulness of the input data as compared to the input color space.

Some additional and/or alternative details related to process 200 may be illustrated in one or more examples of implementations discussed in greater detail below with regard to FIG. 3.

Figure 3:
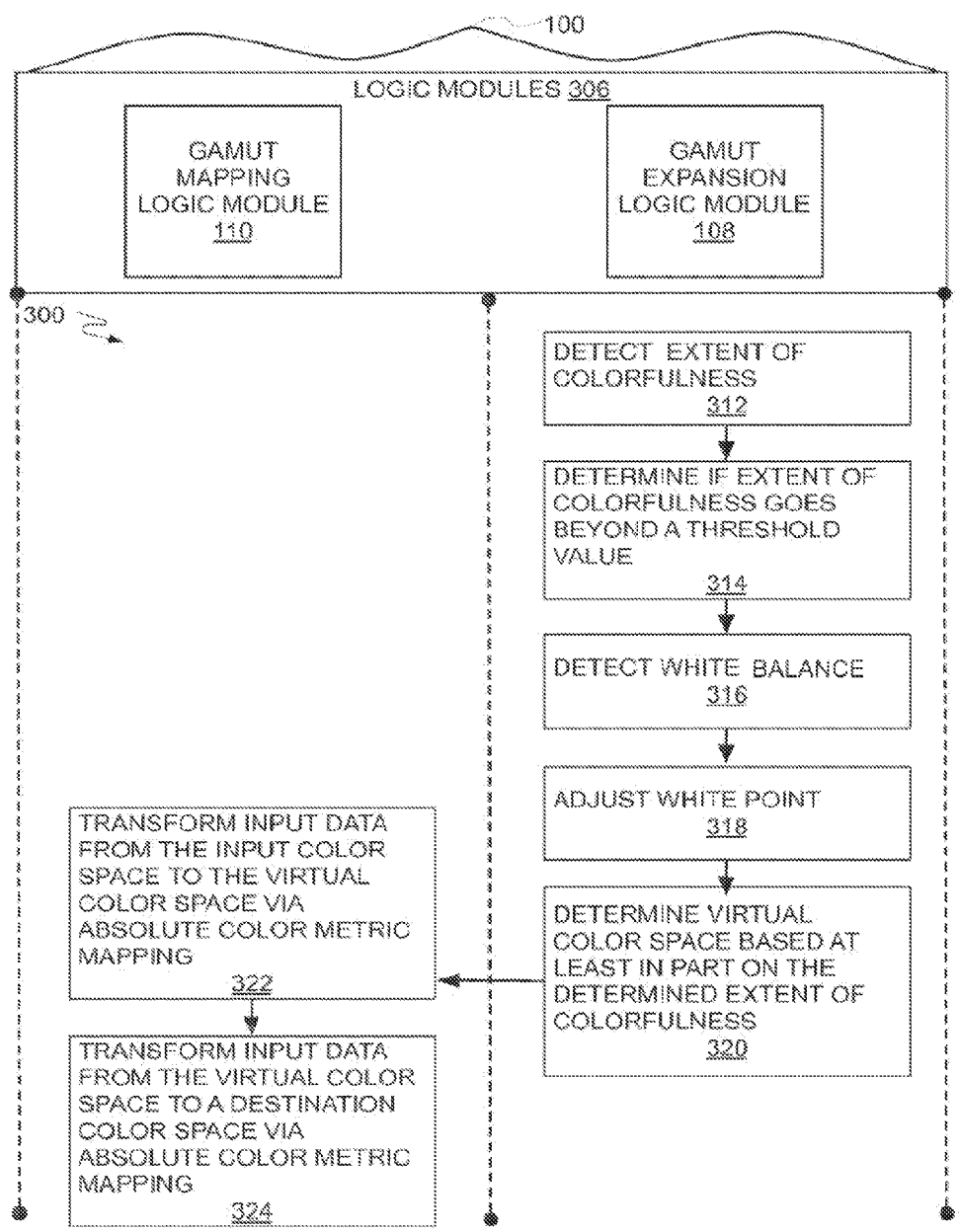
FIG. 3 is a flow chart illustrating an example color management process.

FIG. 3 is a flow chart illustrating an example color management process 300, arranged in accordance with at least some implementations of the present disclosure. In the illustrated implementation, process 300 may include one or more operations, functions or actions as illustrated by one or more of the blocks 312, 314, 316, 318, 320, 322, and/or 324. By way of non-limiting example, process 300 will be described herein with reference to example color management system 100 of FIG. 1.

In the illustrated implementation, color management system 100 may include logic modules 306. For example, logic modules 306, may include context derivation logic module 108, gamut mapping logic module 110, the like, and/or combinations thereof. Although color management system 100, as shown in FIG. 3, may include one particular set of blocks or actions associated with particular modules, these blocks or actions may be associated with different modules than the particular module illustrated here.

Process 300 may be utilized as a computer-implemented method for color management. Process 200 may begin at block 312, "DETECT EXTENT OF COLORFULNESS", where an extent of colorfulness may be detected. For example, an extent of colorfulness may be detected based at least in part on a histogram associated with an input color space.

In some examples, detecting the extent of colorfulness may include determining a scaling factor adapted to adjust component colors. Additionally or alternatively, in some examples, detecting the extent of colorfulness may include determining a true grey point and/or a shifted grey point adapted to correct color shifts.

Processing may continue from operation 312 to operation 314, "DETERMINE IF EXTENT OF COLORFULNESS GOES BEYOND A THRESHOLD VALUE", where a determination may be made that the extent of colorfulness goes beyond a threshold value. For example, later performance of a determination of the virtual color space and the transformation of the input data from the input color space to the virtual color space may be performed in response to a determination that the extent of colorfulness goes beyond a threshold value. To be more specific, if the extent of colorfulness does not exceed a pre-set threshold, the virtual color space can be configured such that color enhancement effect is resulted.

Processing may continue from operation 314 to operation 316, "DETECT WHITE BALANCE", where a white balance may be detected. For example, a white balance associated with the input color space may be detected.

Processing may continue from operation 316 to operation 318, "ADJUST WHITE POINT", where a white point may be adjusted. For example, a white point associated with the virtual color space may be adjusted based at least in part on the detected white balance.

Alternatively, in some implementations, instead of performing operations 316-318, operations configured to hold the white point associated with the virtual color space constant without regard to a detected white balance may be utilized.

Processing may continue from operation 318 to operation 320, "DETERMINE VIRTUAL COLOR SPACE BASED AT LEAST IN PART ON THE DETERMINED EXTENT OF COLORFULNESS", where a virtual color space may be determined. For example, a virtual color space may be determined based at least in part on the detected extent of colorfulness associated with the input color space.

As discussed above, detecting the extent of colorfulness may include determining a scaling factor adapted to adjust component colors. In such examples, the determination of the virtual color space may be based at least in part on the scaling factor.

Processing may continue from operation 320 to operation 322, "TRANSFORM INPUT DATA FROM THE INPUT COLOR SPACE TO THE VIRTUAL COLOR SPACE VIA ABSOLUTE COLOR METRIC MAPPING", where input data from the input color space may be transformed. For example, input data from the input color space may be transformed to the virtual color space via absolute colorimetric mapping.

As discussed above, detecting the extent of colorfulness may include determining a true grey point and/or a shifted grey point adapted to correct color shifts. In such examples, the transformation of the input data from the input color space to the virtual color space is based at least in part on the true grey point and/or the shifted grey point.

Processing may continue from operation 322 to operation 324, "TRANSFORM INPUT DATA FROM THE VIRTUAL COLOR SPACE TO A DESTINATION COLOR SPACE VIA ABSOLUTE COLOR METRIC MAPPING", where input data may be transformed from the virtual color space to a destination color space. For example, transforming input data from the virtual color space to a destination color space associated with a destination device may be performed via absolute colorimetric mapping.

In operation, process 300 may be utilized as a computer-implemented method for color enhancement via gamut expansion. Process 300 may include gamut expansion for general color enhancement. Process 300 may utilize the operation of Absolute Colorimetric Mapping in (1) a detector of extent of colorfulness, and (2) a content-adaptive virtual color space generator to permit color enhancement with a simple 3×3 matrix multiplication. Accordingly, the virtual color space may be adapted to enhance the colorfulness of the input data as compared to the input color space.

In operation, processes 200 and 300, as illustrated in FIGS. 2 and 3, may be utilized as a computer-implemented method for color enhancement via gamut expansion. Processes 200 and/or 300 presents a general color enhancement module based on a variant of the concept behind Absolute Colorimetric Mapping. FIG. 1 shows the framework of the proposed module. Processes 200 and/or 300 may transform the Absolute Colorimetric Mapping (which may be implemented in GPU hardware) to a general color enhancement unit by implementing (1) a detector of the extent of colorfulness of input content in its color space, and/or (2) a content-adaptive virtual color space generator. Processes 200 and/or 300 may provide an economic (e.g., via proper configuration of GPU hardware) solution to general color enhancement of media content.

Figure 8:
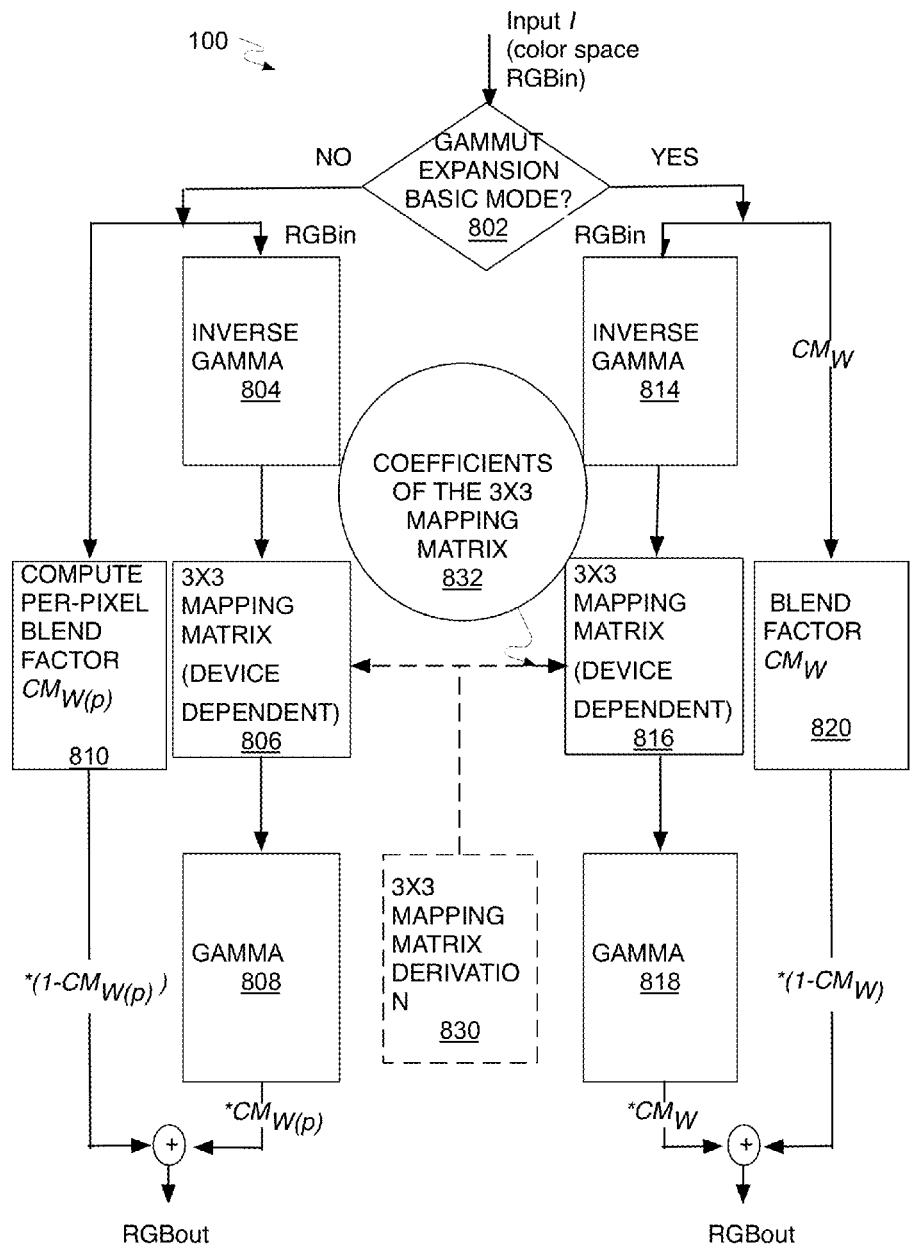
FIG. 8 is a flow chart illustrating another example color management process; all arranged in accordance with at least some implementations of the present disclosure.

FIG. 8 is a flow chart illustrating another illustration of color management system 100. In the illustrated example, color management system 100 may include gamut expansion basic mode module 802, inverse gamma module 804, 3×3 mapping matrix module 806, gamma module 808, inverse gamma 814, 3×3 mapping matrix module 816, gamma module 818, blend factor module 820, 3×3 mapping matrix derivation module 830, and/or coefficients module 832, the like, and/or combinations thereof. In this example, gamut expansion basic mode module 802, inverse gamma module 804, 3×3 mapping matrix module 806, gamma module 808, module inverse gamma 814, 3×3 mapping matrix module 816, gamma module 818, and blend factor module 820 may be implemented by hardware in the graphics processing unit of system 100. Similarly, 3×3 mapping matrix derivation module 830 may be implemented by software, while coefficients module 832 may be implemented as hardware state parameters. However, the present disclosure is not limited in this regard, and any of the modules illustrated in FIG. 8 may be implemented by any combination of hardware, firmware and/or software.

In operation, gamut expansion basic mode module 802 may determine if a gamut expansion basic mode is to be used or not. Utilizing module 810, non-basic gamut expansion mode calculates per-pixel content adaptive blending factor CMw(p) to provide per-pixel blending between the input image and the absolute colorimetric mapping of the input as the output result of gamut expansion module. Basic mode, on the other hand, takes a pre-configured blending factor CMw to provide the global blending between the input image and the absolute colorimetric mapping of the input as the output of gamut expansion module. Module inverse gamma 804/814, 3×3 mapping matrix module 806/816, and gamma module 808/818 may perform absolute colorimetric mapping. For non-basic mode, the absolute colorimetric mapping performed by module inverse gamma 804, 3×3 mapping matrix module 806, and gamma module 808 may be modified by per-pixel blend factor CMw(p) calculated by module 810. For basic mode, a pure absolute colorimetric mapping is achievable with module inverse gamma 814, 3×3 mapping matrix module 816, gamma module 818, and setting CMw=1 in module 820.

In operation, 3×3 mapping matrix derivation module 830 may derive coefficients 832 of the 3×3 mapping matrix. Such coefficients 832 may be retrieved from the Original Equipment Manufacturer (OEM). Such coefficients 832 may include values $R_{in}$, $G_{in}$, $B_{in}$, $W_{in}$, $R_{OUT}$, $G_{OUT}$, $B_{OUT}$, $W_{OUT}$.

In the following, the proposed variant concept of Absolute Colorimetric Mapping may embed the content-adaptive virtual color space generator for general color enhancement. The detector of the extent of colorfulness of input content is then presented in Section 2.2. Finally in Section 2.3, an example experimental result of enhancing colors of a video sequence captured under low-lighting condition with the invention is shown.

2.1 A Variation of Absolute Colorimetric Mapping for General Color Enhancement

Absolute Colorimetric Mapping is one of the four general categories of gamut mapping defined by ICC color management. Absolute Colorimetric Mapping is commonly used to match input content to an output device with its gamut different from that of the input content for better visualization.

Denoting the (linear) color space of input content as $RGB_{in}$, the (linear) color space of an output device as $RGB_{out}$, Absolute Colorimetric matches measured value (e.g., primary $(R^P_{in}, G^P_{in}, B^P_{in})$ of $RGB_{in}$ in XYZ space) to measured value (e.g., primary $(R^P_{out}, G^P_{out}, B^P_{out})$ of $RGB_{out}$ in XYZ space). Gamut mapping between in $RGB_{in}$ and out $RGB_{out}$ is then achieved through a 3×3 matrix multiplication:

$$\begin{bmatrix} R_{out} \\ G_{out} \\ B_{out} \end{bmatrix} = M_{out}^{-1} M_{in} \begin{bmatrix} R_{in} \\ G_{in} \\ B_{in} \end{bmatrix}, \quad (1\text{-}1)$$

where $$M_{out} = \begin{bmatrix} X^P_{R_{out}} & Y^P_{R_{out}} & Z^P_{R_{out}} \\ X^P_{G_{out}} & Y^P_{G_{out}} & Z^P_{G_{out}} \\ X^P_{B_{out}} & Y^P_{B_{out}} & Z^P_{B_{out}} \end{bmatrix}, \text{ and } M_{in} = \begin{bmatrix} X^P_{R_{in}} & Y^P_{R_{in}} & Z^P_{R_{in}} \\ X^P_{G_{in}} & Y^P_{G_{in}} & Z^P_{G_{in}} \\ X^P_{B_{in}} & Y^P_{B_{in}} & Z^P_{B_{in}} \end{bmatrix}. \quad (1\text{-}2)$$

Where $M_{out}/M_{in}$ in Eq. (1-2) is the 3×3 matrix transforming between linear RGB and CIE XYZ; $(XR^P_{out}, YG^P_{out}, ZB^P_{out})$ are the tristimulus values of $R^P_{out}$ at its maximum value, and similarly for $G^P_{out}$, $B^P_{out}$, and $(R^P_{in}, G^P_{in}, B^P_{in})$. Note that rather than specifying the tristimulus values for each primary, it is more common to specify the chromaticity coordinates (e.g., (x, y, z), x+y+z=1) of the primary colors and the white point, W, plus the maximum luminance of white $Y_W$.

Processes 200 and/or 300 may take the same operation as Eq. (1-1), but transform the concept of mapping two different gamut to the mapping of $RGB_{in}$ to an intermediate "virtual" color space $RGB_{virtual}$, where the color of an input can be manipulated to have better visual appearance with the actual output color space being $RGB_{in}$. That is $$\begin{bmatrix} R_{in\_enhanced} \\ G_{in\_enhanced} \\ B_{in\_enhanced} \end{bmatrix} = M_{virtual}^{-1} M_{in} \begin{bmatrix} R_{in} \\ G_{in} \\ B_{in} \end{bmatrix}. \quad (2\text{-}1)$$

Denoting the chromaticity values of $(R^P_{in}, G^P_{in}, B^P_{in})$ and $W_{in}$ (e.g., the white point in $RGB_{in}$) as $((x^P_{R\_in}, y^P_{R\_in}), (x^P_{G\_in}, y^P_{G\_in}), (x^P_{B\_in}, y^P_{B\_in}))$ and $(x_{W_{in}}, y_{W_{in}})$, $RGB_{virtual}$ may be generated with its primary $(R^P_{virtual}, G^P_{virtual}, B^P_{virtual})$ and white point $W_{virtual}$ illustrated as $$(x^P_{R_{virtual}}, y^P_{R_{virtual}}) = sf_R(x^P_{R_{in}} - x_{W_{in}}, y^P_{R_{in}} - y_{W_{in}}) + (x_{W_{virtual}}, y_{W_{virtual}}) \quad (2\text{-}2)$$

$$(x^P_{G_{virtual}}, y^P_{G_{virtual}}) = sf_G(x^P_{G_{in}} - x_{W_{in}}, y^P_{G_{in}} - y_{W_{in}}) + (x_{W_{virtual}}, y_{W_{virtual}})$$

$$(x^P_{B_{virtual}}, y^P_{B_{virtual}}) = sf_B(x^P_{B_{in}} - x_{W_{in}}, y^P_{B_{in}} - y_{W_{in}}) + (x_{W_{virtual}}, y_{W_{virtual}})$$

$$(x_{W_{virtual}}, y_{W_{virtual}}) = \begin{bmatrix} \cos\theta & -\sin\theta \\ \sin\theta & \cos\theta \end{bmatrix} (x_{W_{in}} + y_{W_{in}}) + (x_\Delta, y_\Delta).$$

Where $sf_R/sf_G/sf_B$ may represent the scaling factor for stretching/suppressing component colors while $\Theta$ and $(x_\Delta, y_\Delta)$ may represent parameters utilized for color correction. The matrix transforming $RGB_{virtual}$ to CIE XYZ can be derived from Eq. (2-2) as $$M_{virtual} = \frac{\begin{bmatrix} x^P_{R_{virtual}}S(1) & x^P_{G_{virtual}}S(2) & x^P_{B_{virtual}}S(3) \\ y^P_{R_{virtual}}S(1) & y^P_{G_{virtual}}S(2) & y^P_{B_{virtual}}S(3) \\ z^P_{R_{virtual}}S(1) & z^P_{G_{virtual}}S(2) & z^P_{B_{virtual}}S(3) \end{bmatrix}}{(y^P_{R_{virtual}}S(1) + y^P_{G_{virtual}}S(2) + y^P_{B_{virtual}}S(3))}, \quad (2\text{-}3)$$

where $$S = \begin{bmatrix} x^P_{R_{virtual}} & x^P_{G_{virtual}} & x^P_{B_{virtual}} \\ y^P_{R_{virtual}} & y^P_{G_{virtual}} & y^P_{B_{virtual}} \\ z^P_{R_{virtual}} & z^P_{G_{virtual}} & z^P_{B_{virtual}} \end{bmatrix}^{-1} \begin{bmatrix} x_{W_{virtual}} \\ y_{W_{virtual}} \\ z_{W_{virtual}} \end{bmatrix} * Y_{W_{virtual}}. \quad (2\text{-}4)$$

Figure 5:
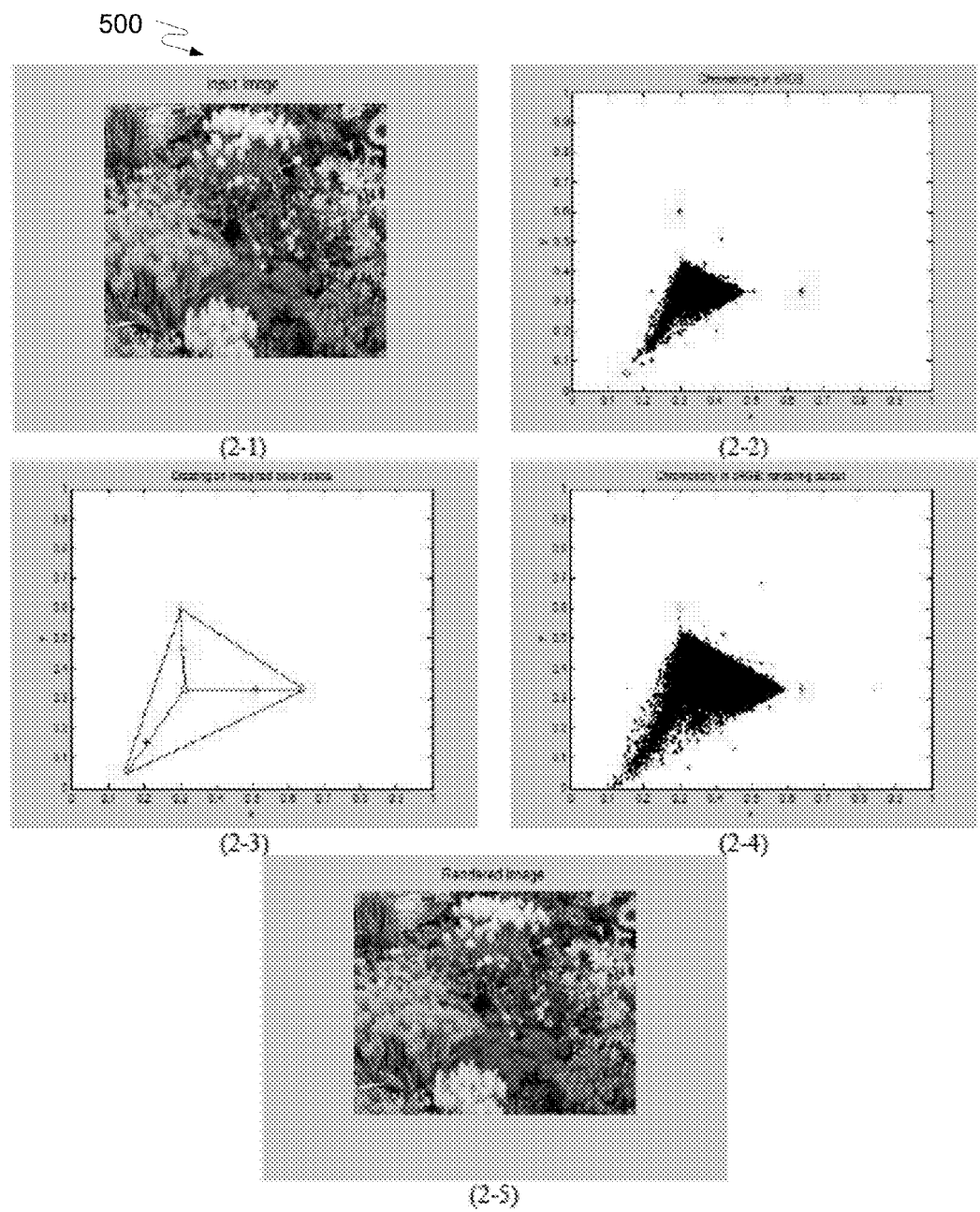
FIG. 5 is an illustrative diagram of an example color gamut.

Note that x+y+z=1 and S(k) represents the kth component of S. The above formula (e.g., Eq. (2-3) and (2-4)) may be generally used for deriving linear RGB to CIE XYZ transform matrix. FIG. 5 shows an example to illustrate the manipulation of color based on this variant concept of Absolute Colorimetric Mapping. While input content (2-2) shows the original color distribution of the input content, it can be observed from chromaticity distribution (2-4) that the extent of color distribution of the manipulated/processed input has been expanded. Therefore, more vivid color can be expected from the processed content.

2.2 A Detector of Extent of Colorfulness

Figure 4:
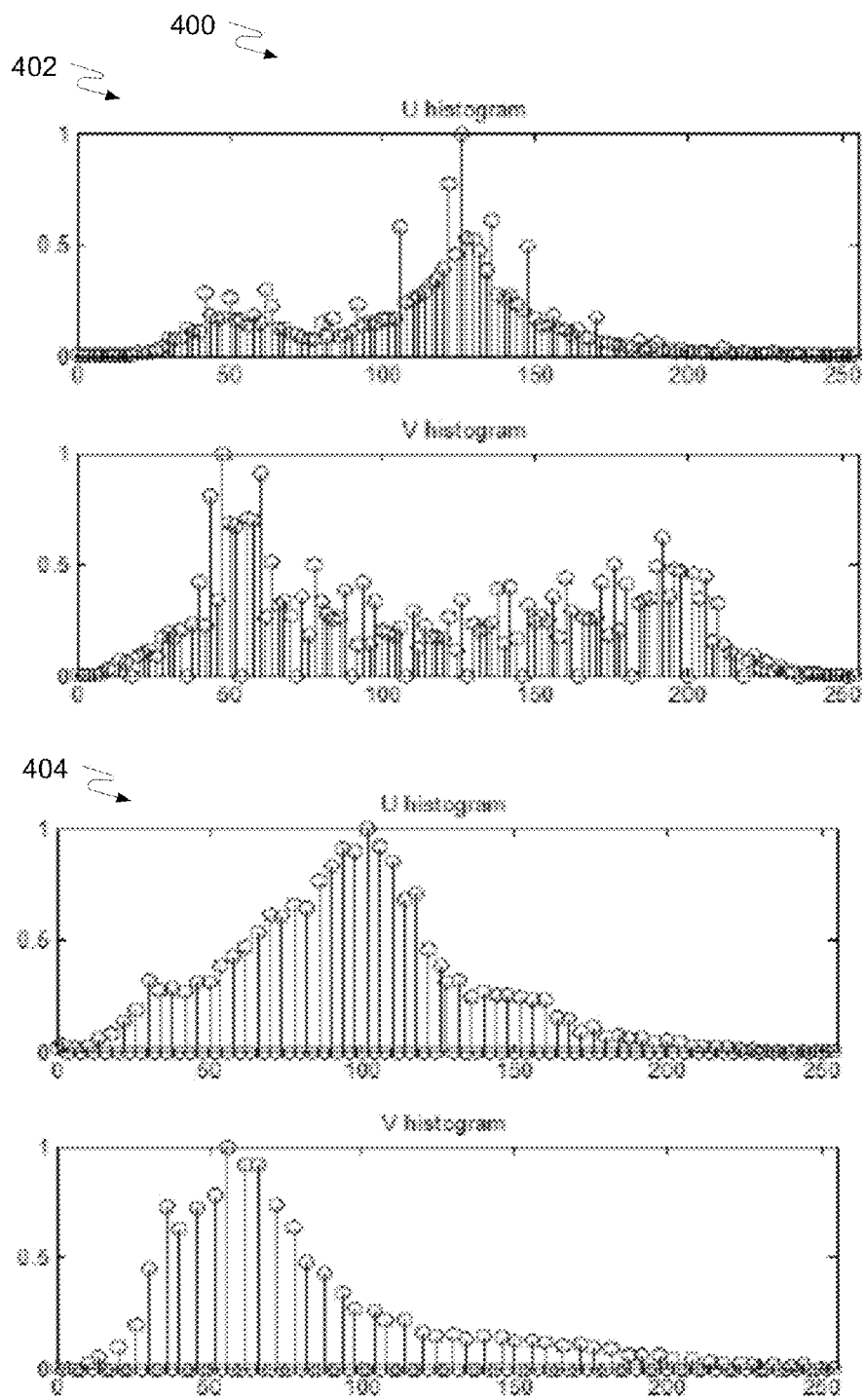
FIG. 4 is an illustrative diagram of an example histogram pattern.

The specification of $sf_R/sf_G/sf_B$, $\Theta$ and $(x_\Delta, y_\Delta)$ in Eq. (2-2) may be utilized to generate a proper "virtual" color space for color enhancement based on the operation of Absolute Colorimetric Mapping. $\Theta$ and $(x_\Delta, y_\Delta)$ may be utilized as parameters available for correcting color shift of input content, and may be obtained/derived from related modules in a GPU graphics pipeline. For example, the information of true gray point and shifted gray point which can be translated to the information of $(x_{W_{virtual}}, y_{W_{virtual}})$ and $(x_{W_{in}}, y_{W_{in}})$ and here can be obtained from the Automatic White Balance (AWB) module in a GPU. For input without color distortion but with less colorfulness, enhancement may be achieved with proper specification of $sf_R/sf_G/sf_B$ in Eq. (2-2). To achieve automatic, content-adaptive enhancement, a detector of the extent of color/colorfulness input content might be utilized. Such a detector may work based on statistics derived from U/V histogram which is available from a GPU graphics pipeline:

$$sf_k = \begin{cases} f_k^a(\mu_U - 128, \mu_V - 128) * \\ h_k^a(|\sigma_u - \sigma_{th}|, |\sigma_v - \sigma_{th}|), & \text{if } (\sigma_u > \sigma_{th}) \& (\sigma_v > \sigma_{th}) \\ f_k^b(\mu_U - 128, \mu_V - 128) * \\ h_k^b(|\sigma_u - \sigma_{th}|, |\sigma_v - \sigma_{th}|), & \text{else,} \end{cases} \quad (3\text{-}1)$$

Where k∈(R, G, B), $(\mu_U, \mu_V)$ may represent the mean value of the U/V histogram for 8-bit input and $(\sigma_U, \sigma_V)$ may represent the standard deviation of the normalized U/V histogram (e.g., normalized to the sum of the histogram). The intuition behind Eq. (3-1) is that a more colorful image should have its U/V histogram more equally distributed and thus $\sigma_U/\sigma_V$ may serve as a good indicator for the extent of color/colorfulness an input has. Some practical examples are shown in FIG. 4. In some examples, $\sigma_{th}$ in Eq. (3-1) may represent a threshold value for determining whether an input is "non-colorful" enough for color enhancement to be applied on it.

Also, $f_k^b(\mu_U-128, \mu_V-128)*h_k^b(|\sigma_U, -\sigma_{th}|, |\sigma_V-\sigma_{th}|)$ would be set to be 1. $h_k^a (|\sigma_U, -\sigma_{th}|, |\sigma_V-\sigma_{th}|)\in(0,1)$ is a function proportional to $(|\sigma_U, -\sigma_{th}|$ and $\sigma_V-\sigma_{th}|$. While $(\mu_U-128)$ and $(\mu_V-128)$ can provide a rough estimation of majority color input content, $f_k^a(\mu_U-128, \mu_V-128)\in(0,1)$ in Eq. (3-1) may provide the user a function that may be adjustable to stretch each primary differently according to the major color of the content.

Note that the practical usage of Eq. (2-1) and Eq. (3-1) is not limited to color enhancement and thus the range of $f_k^a(\mu_U-128,\mu_V-128)$, $f_k^b(\mu_U-128, \mu_V-128)$, $h_k^a(|\sigma_U,-\sigma_{th}|, |\sigma_V-\sigma_{th}|)$, and $h_k^b(|\sigma_U,-\sigma_{th}|, |\sigma_V-\sigma_{th}|)$ are not confined to the ranges described above.

2.3 Experimental Results

The proposed detector and the enhancement approach based on the variant of Absolute Colorimetric Mapping have been applied to images/video with low quality of colors. For example, a snap shot of video was captured with laptop built-in web-cam under low-lighting condition. $(\Theta, x_A, y_A)$ was set to be $(0,0,0)$ and the resulted $(sf_R/sf_G/sf_B)$ was $(0.8, 0.55, 0.85)$. An improvement of the color after applying the invention was observed. Note that the enhanced output does not guarantee to be "true color". To embed color correction in the process, related information (e.g., information from AWB module or information about the lighting of the capture) may be used to derive a proper $(\Theta, x_A, y_A)$.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer-program products. Such program products may include signal bearing media providing instructions that, when executed by, for example, a processor, may provide the functionality described herein. The computer-program products may be provided in any form of computer-readable medium. Thus, for example, a processor including one or more processor core(s) may undertake one or more of the blocks shown in FIGS. 3 and 4 in response to instructions conveyed to the processor by a computer-readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

FIG. 4 is an illustrative diagram of an example histogram pattern. In the illustrated implementation 400, images with higher extent of colorfulness in general have U/V histograms more equally distributed. For example, U/V histogram 402 may be associated with an image with more color/colorfulness while U/V histogram 404 may be associated with an image with less colorfulness. Note that the U/V histogram may be normalized to its maximum value for better visualization here.

FIG. 5 is an illustrative diagram of an example color gamut. In the illustrated implementation 500, manipulation of the color with the variant concept of Absolute Colorimetric Mapping is shown for better visualization. In the illustration, input image (2-1), a chromaticity distribution of the input (2-2) where the chromaticity of the primary is shown as the red, green, and blue square respectively, a virtual color space (2-3) with its white point same as the input color space and its primary is shown as star, a chromaticity distribution (2-4) of the manipulated color (e.g.:

$$M_1 \begin{bmatrix} R_{in\_enhanced} \\ G_{in\_enhanced} \\ B_{in\_enhanced} \end{bmatrix},$$

and a resultant enhanced input (2-5) is shown.

Figure 6:
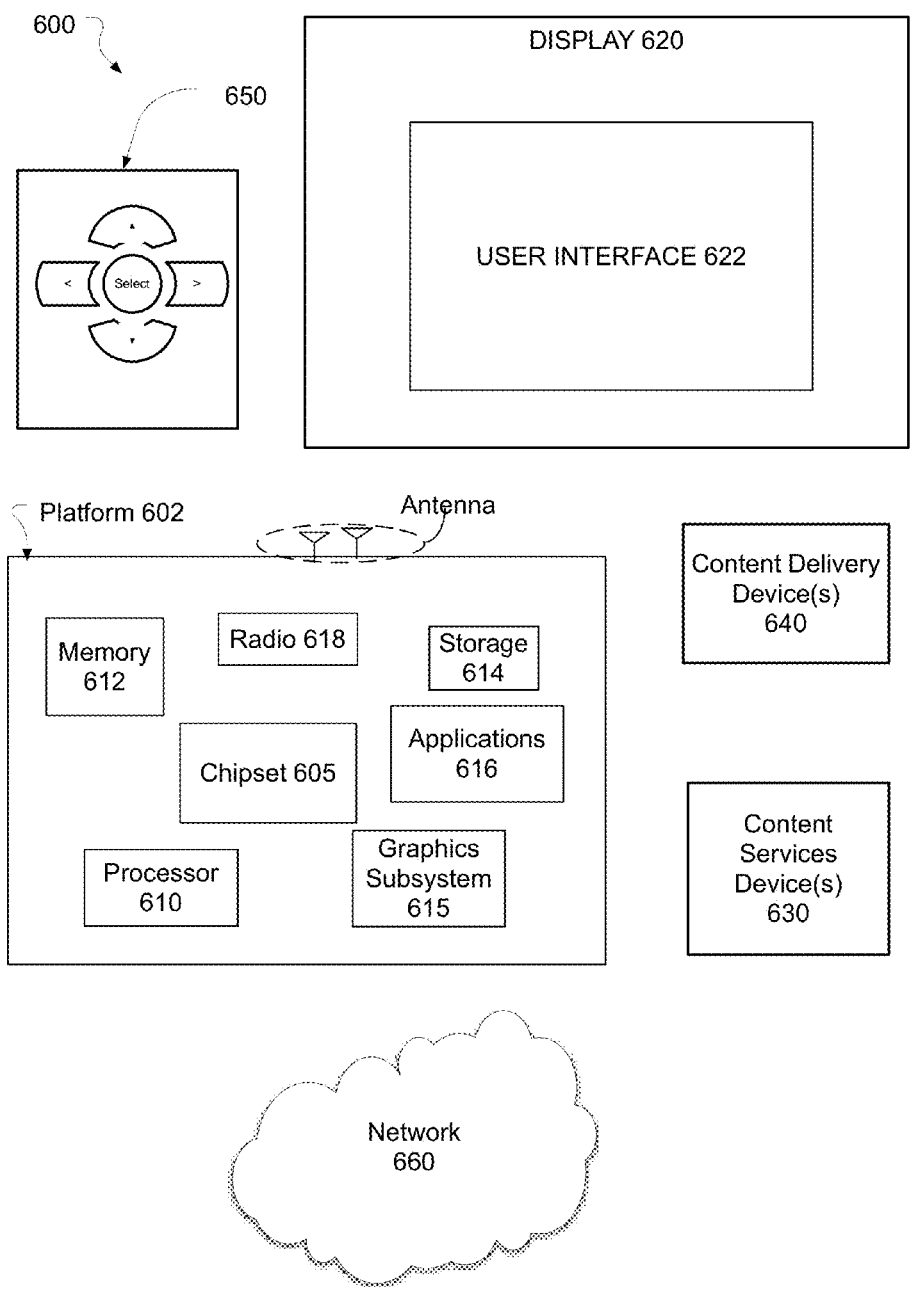
FIG. 6 is an illustrative diagram of an example system.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, Display Port, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for (8.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
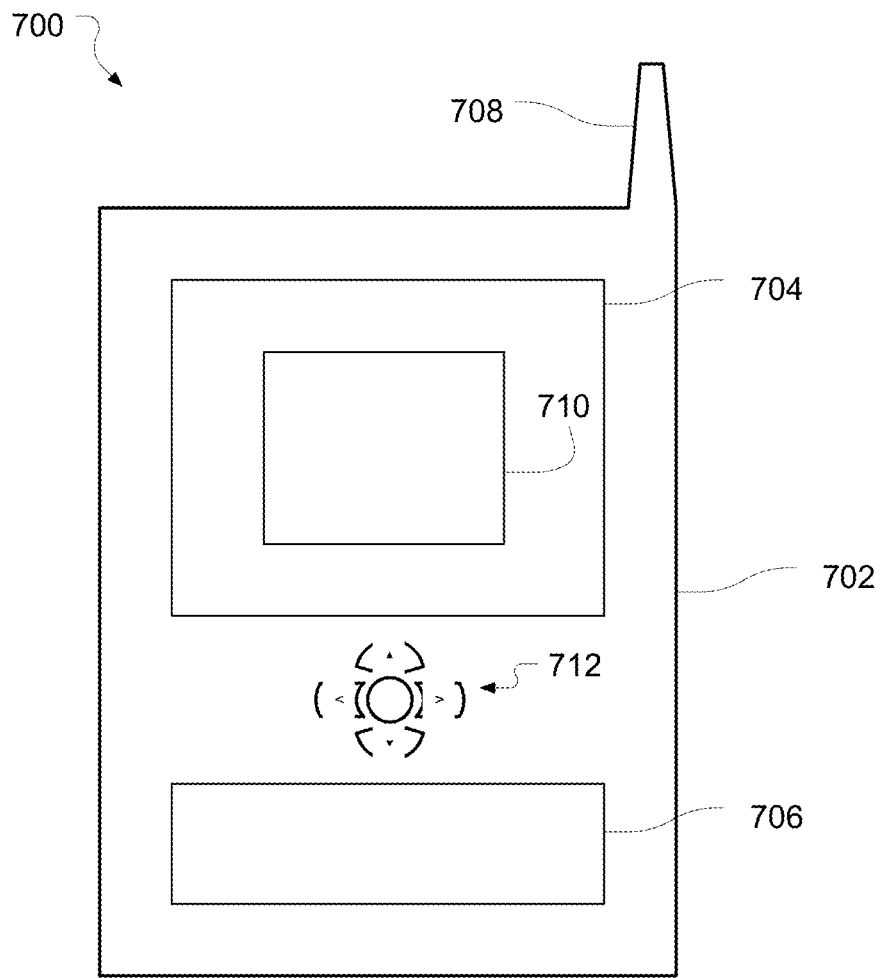
FIG. 7 is an illustrative diagram of an example system.

As described above, system 600 may be embodied in varying physical styles or form factors. FIG. 7 illustrates implementations of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for color management, the method comprising:
    detecting by a gamut expansion logic module an extent of colorfulness of input data of an image based at least in part on a histogram associated with an input color space of the input data;
    determining by the gamut expansion logic module a virtual color space based at least in part on the detected extent of colorfulness associated with the input color space of the input data;
    transforming by a gamut mapping logic module, the input data of the input color space to the virtual color space via absolute colorimetric mapping; and
    transforming by the gamut mapping logic module the input data from the virtual color space to a destination color space associated with a destination device via absolute colorimetric mapping.

2. The method of claim 1, further comprising: performing the determination of the virtual color space and the transformation of the input data from the input color space to the virtual color space in response to a determination that the extent of colorfulness goes beyond a threshold value.

3. The method of claim 1, further comprising: holding by the gamut expansion module a white point associated with the virtual color space constant without regard to a detected white balance.

4. The method of claim 1, further comprising:
    detecting by the gamut expansion module a white balance associated with the input color space; and
    adjusting by the gamut expansion module a white point associated with the virtual color space based at least in part on the detected white balance.

5. The method of claim 1, wherein detecting the extent of colorfulness comprises determining a scaling factor adapted to adjust component colors, and wherein the determination of the virtual color space is based at least in part on the scaling factor.

6. The method of claim 1, wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point.

7. The method of claim 1, wherein the virtual color space is adapted to enhance the colorfulness of the input data as compared to the input color space.

8. The method of claim 1, further comprising:
    performing the determination of the virtual color space and the transformation of the input data from the input color space to the virtual color space in response to a determination that the extent of colorfulness goes beyond a threshold value; and
    holding by the gamut expansion module a white point associated with the virtual color space constant without regard to a detected white balance,
    wherein detecting the extent of colorfulness includes determining a scaling factor adapted to adjust component colors, and wherein the determination of the virtual color space is based at least in part on the scaling factor,
    wherein detecting the extent of colorfulness includes determining a true grey point and/or a shifted grey point adapted to correct color shifts, and wherein the transformation of the input data from the input color space to the virtual color space is based at least in part on the true grey point and/or the shifted grey point, and
    wherein the virtual color space is adapted to enhance the colorfulness of the input data as compared to the input color space.

9. The method of claim 1, further comprising:
    performing the determination of the virtual color space and the transformation of the input data from the input color space to the virtual color space in response to a determination that the extent of colorfulness goes beyond a threshold value;
    detecting by the gamut expansion module a white balance associated with the input color space; and
    adjusting by the gamut expansion module a white point associated with the virtual color space based at least in part on the detected white balance,
    wherein detecting the extent of colorfulness comprises determining a scaling factor adapted to adjust component colors, and wherein the determination of the virtual color space is based at least in part on the scaling factor,
    wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and
    wherein the virtual color space is adapted to enhance the colorfulness of the input data as compared to the input color space.

10. A system for color management on a computer, the system comprising:
    one or more destination devices configured to present video data;
    one or more graphics processing units communicatively coupled to the one or more destination devices;
    one or more memory stores communicatively coupled to the one or more graphics processing units;
    a gamut expansion logic module implemented by the one or more graphics processing units and configured to:
        detect an extent of colorfulness based at least in part on a histogram associated with an input color space of input data of an image input to the gamut expansion logic module, and
        determine a virtual color space based at least in part on the detected extent of colorfulness associated with the input color space of the input data; and a gamut mapping logic module implemented by the one or more graphics processing units and configured to:
transform input data from the input color space to the virtual color space via absolute colorimetric mapping, and
transform input data from the virtual color space to a destination color space associated with a destination device via absolute colorimetric mapping.

11. The system of claim 10, wherein the gamut expansion logic module is further configured to: perform the determination of the virtual color space and the transformation of the input data from the input color space to the virtual color space in response to a determination that the extent of colorfulness goes beyond a threshold value.

12. The system of claim 10, wherein the gamut expansion logic module is further configured to: hold a white point associated with the virtual color space constant without regard to a detected white balance.

13. The system of claim 10, wherein the gamut expansion logic module is further configured to:
detect the white balance adjusting the white balance associated with the input color space; and
adjust a white point associated with the virtual color space based at least in part on the detected white balance.

14. The system of claim 10, wherein detecting the extent of colorfulness includes determining a scaling factor adapted to adjust component colors, and wherein the determination of the virtual color space is based at least in part on the scaling factor.

15. The system of claim 10, wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point.

16. The system of claim 10, wherein the virtual color space is adapted to enhance the colorfulness of the input data as compared to the input color space.

17. The system of claim 10,
wherein the gamut expansion logic module is further configured to: perform the determination of the virtual color space and the transformation of the input data from the input color space to the virtual color space in response to a determination that the extent of colorfulness goes beyond a threshold value, and hold a white point associated with the virtual color space constant without regard to a detected white balance,
wherein detecting the extent of colorfulness comprises determining a scaling factor adapted to adjust component colors, and wherein the determination of the virtual color space is based at least in part on the scaling factor,
wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and
wherein the virtual color space is adapted to enhance the colorfulness of the input data as compared to the input color space.

18. The system of claim 10,
wherein the gamut expansion logic module is further configured to: perform the determination of the virtual color space and the transformation of the input data from the input color space to the virtual color space in response to a determination that the extent of colorfulness goes beyond a threshold value, detect the white balance adjusting the white balance associated with the input color space, and adjust a white point associated with the virtual color space based at least in part on the detected white balance,
wherein detecting the extent of colorfulness comprises determining a scaling factor adapted to adjust component colors, and wherein the determination of the virtual color space is based at least in part on the scaling factor,
wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and
wherein the virtual color space is adapted to enhance the colorfulness of the input data as compared to the input color space.

19. An article for color management on a computer comprising a non-transitory machine-readable medium comprising a plurality of instructions that, in response to being executed in a computing device, result in:
detecting an extent of colorfulness based at least in part on a histogram associated with an input color space of input data of an image;
determining a virtual color space based at least in part on the detected extent of colorfulness associated with the input color space of the input data; and
transforming the input data from the input color space to the virtual color space via absolute colorimetric mapping; and
transforming the input data from the virtual color space to a destination color space associated with a destination device via absolute colorimetric mapping.

20. The article of claim 19, further comprising:
performing the determination of the virtual color space and the transformation of the input data from the input color space to the virtual color space in response to a determination that the extent of colorfulness goes beyond a threshold value; and
holding a white point associated with the virtual color space constant without regard to a detected white balance,
wherein detecting the extent of colorfulness comprises determining a scaling factor adapted to adjust component colors, and wherein the determination of the virtual color space is based at least in part on the scaling factor,
wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and
wherein the virtual color space is adapted to enhance the colorfulness of the input data as compared to the input color space.

21. The article of claim 19, further comprising:
performing the determination of the virtual color space and the transformation of the input data from the input color space to the virtual color space in response to a determination that the extent of colorfulness goes beyond a threshold value;
detecting a white balance associated with the input color space; and
adjusting a white point associated with the virtual color space based at least in part on the detected white balance,
wherein detecting the extent of colorfulness comprises determining a scaling factor adapted to adjust component colors, and wherein the determination of the virtual color space is based at least in part on the scaling factor, wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and wherein the virtual color space is adapted to enhance the colorfulness of the input data as compared to the input color space.

22. An apparatus, comprising:

a gamut expansion means for:
- detecting an extent of colorfulness based at least in part on a histogram associated with an input color space of input data of an image, and
- determining a virtual color space based at least in part on the detected extent of colorfulness associated with the input color space; and a gamut mapping means for:
- transforming the input data from the input color space to the virtual color space via absolute colorimetric mapping, and
- transform the input data from the virtual color space to a destination color space associated with a destination device via absolute colorimetric mapping.

23. The apparatus of claim 22, further comprising:

wherein the gamut expansion means is further for performing the determination of the virtual color space and the transformation of the input data from the input color space to the virtual color space in response to a determination that the extent of colorfulness goes beyond a threshold value, and holding a white point associated with the virtual color space constant without regard to a detected white balance, wherein detecting the extent of colorfulness comprises determining a scaling factor adapted to adjust component colors, and wherein the determination of the virtual color space is based at least in part on the scaling factor, wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and wherein the virtual color space is adapted to enhance the colorfulness of the input data as compared to the input color space.

24. The apparatus of claim 22, wherein the gamut expansion means is further for performing the determination of the virtual color space and the transformation of the input data from the input color space to the virtual color space in response to a determination that the extent of colorfulness goes beyond a threshold value, detecting a white balance associated with the input color space, and adjusting a white point associated with the virtual color space based at least in part on the detected white balance, wherein detecting the extent of colorfulness comprises determining a scaling factor adapted to adjust component colors, and wherein the determination of the virtual color space is based at least in part on the scaling factor, wherein detecting the extent of colorfulness comprises determining a true grey point and/or a shifted grey point adapted to correct color shifts, and wherein the transformation of the input data from the input color space to the virtual color space is based at least in part on the true grey point and/or the shifted grey point, and wherein the virtual color space is adapted to enhance the colorfulness of the input data as compared to the input color space.

* * * * *